Sept. 9, 1952

T. V. ZALOUDEK 2,610,298

STABILIZED SAW TOOTH OSCILLATOR

Filed Dec. 26, 1947

Inventor:
Theodore V. Zaloudek,
by Merton D. Moore
His Attorney.

Patented Sept. 9, 1952 2,610,298

UNITED STATES PATENT OFFICE 2,610,298

STABILIZED SAW TOOTH OSCILLATOR

Theodore V. Zaloudek, Bridgeport, Conn., assignor to General Electric Company, a corporation of New York Application December 26, 1947, Serial No. 793,944

5 Claims. (Cl. 250—36)

This invention relates to cathode ray tube deflection oscillators and more particularly to those employed in television receivers.

In a television receiver, the cathode ray beam of the image reproducing tube must be deflected in synchronism with the cathode ray beam of the television pick-up tube supplying the video signals received by the receiver. To accomplish this, synchronizing signals are transmitted following each line, and these signals are usually referred to as horizontal synchronizing impulses. Similarly, synchronizing signals are transmitted following each field, and these are usually referred to as vertical synchronizing impulses. These horizontal and vertical impulses are received at the receiver, separated from the video signals and from each other, and applied respectively to the horizontal and vertical deflection oscillators, which control the image reproducing tube, so that these oscillators may be synchronized with the circuits of the television pick-up tube at the transmitter.

These impulses are usually adequate, under ideal conditions, to maintain synchronism between the receiver and the transmitter. However, in the presence of noise, interference, and other adverse conditions, it is possible for the receiver to drop out of synchronism with the transmitter, and for the image to become unintelligible.

In order to obtain a more positive synchronism between the receiver and the transmitter, various forms of automatic frequency control circuits have been devised, and in such circuits the frequency of operation of the deflection oscillator is automatically controlled. This control is accomplished by a phase comparison of the received synchronous impulses, and the deflection impulses generated by the beam deflection oscillator. As the received impulses are not applied directly to the deflection oscillator, but to the automatic frequency control circuit, the deflection generator is substantially unaffected by random noise impulses.

The conventional control circuits are phase detectors, and are sensitive to a very narrow range of frequency variations. Once the phase detector has assumed control of the oscillator, the operation of these circuits is very satisfactory. If for any reason the frequency of the oscillator should drift outside the range of the control circuit, there is no restoring force to pull the oscillator back into synchronism.

It is evident, therefore, that with the conventional control circuits, loss of synchronism might be encountered due to line variations, and also, for example, in switching stations, and oscillator drift during the warm-up period.

In accordance with this invention a free-running deflection oscillator is provided, the frequency of which is stabilized to such an extent that it always falls within the working range of the automatic frequency control circuit.

It is, therefore, an object of this invention to provide a stable deflection oscillator for a cathode ray image tube of a television receiver and to control the frequency of this oscillator by means of a phase detector type automatic frequency control circuit.

Another object of my invention is to stabilize the free-running frequency of a cathode ray deflection oscillator, by the inclusion of a resonant circuit, tuned to the synchronizing pulse frequency, in the cathode circuit of the oscillator.

The features of this invention which are believed to be novel are set forth with particularity in the appended claims. The invention itself, however, together with further objects and advantages thereof, may best be understood by reference to the accompanying drawing, wherein:

Figure 1:
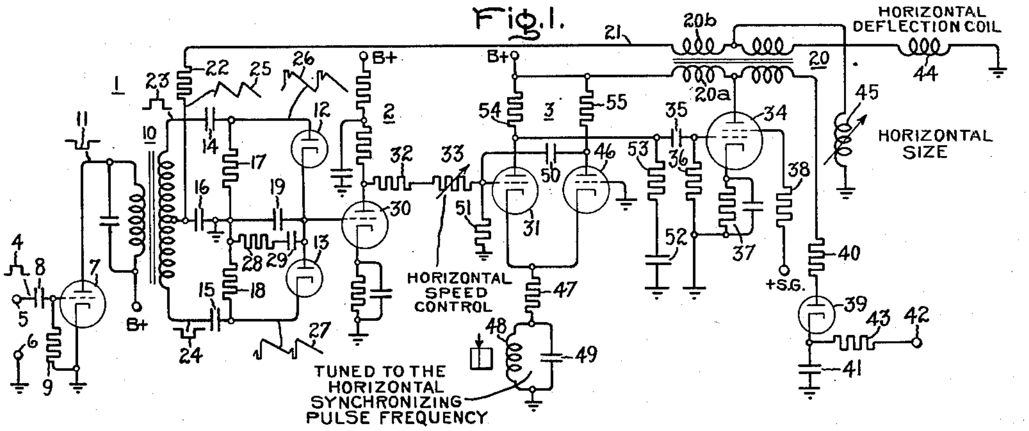
Fig. 1 shows one form of my invention as applied to the horizontal deflection circuit of a television receiver cathode ray image tube, although the invention may similarly be applied to the vertical deflection circuit of the image tube.

Referring particularly to Fig. 1, the automatic frequency control circuit is represented generally as 1, a direct current amplifier is designated as 2, and a free-running multivibrator type deflection oscillator is shown as 3. Horizontal synchronizing impulses 4, received from the transmitter, and separated from the video signals and other synchronizing signals, are applied between the terminals 5 and 6. These impulses are applied to the control electrodes of the electron discharge device 7, through a capacitor 8. The cathode of the discharge device 7 is connected to ground, and the control electrode of this discharge device is connected to ground through the usual grid leak resistor 9. Unidirectional potential is supplied to the anode of the discharge device 7, through the primary winding of transformer 10, from a unidirectional potential source B+. The impulses 4 are amplified, and reversed in phase by discharge device 7, and applied to the primary winding of transformer 10, as shown at 11. Two diode rectifying devices 12 and 13 are connected across the secondary of transformer 10, as shown. The anode of diode 12 is connected to one end of the secondary of transformer 10, through a capacitor 14. The cathode of the diode 13 is connected to the other end of the secondary of transformer 10 through a capacitor 15. The midpoint of the secondary winding is connected to ground through a capacitor 16. Two resistors 17 and 18 are also connected in series across the secondary winding, through capacitors 14 and 15 respectively, and the junction of these resistors is grounded. The cathode of diode 12 is connected to the anode of diode 13 and this common connection is connected to ground through a capacitor 19. The output deflection voltage is fed back from the output transformer 20 by way of the lead 21, and is connected to the midpoint of the secondary winding of the transformer 10, through a resistor 22.

It will be readily seen, that the impulses 11 are applied to the diodes 12 and 13 in opposite phase, as shown at 23 and 24, and the output of the deflection voltage shown at 25, is applied to the diodes in like phase. The synchronizing impulses and the deflection voltage combine as shown at 26 and 27, and it is apparent that the amplitude of the resulting output pulses is dependent on the phase between the two. The output pulses are integrated in a resistance capacitance circuit 28, 29, connected across the capacitor 19, and the resulting direct current output is applied to the control electrode of the electron discharge device 30. The direct current amplifier circuit 2 is of conventional design and forms no part of the present invention, and a detailed description is believed to be unnecessary. There is present at the anode of the electron discharge device 30 a unidirectional control voltage, the amplitude of which is dependent on the phase difference between the synchronizing impulses and the generator deflection voltage. It is apparent that the automatic frequency control circuit may be so designed that the amplitude of this control voltage is that required to maintain the deflection generator 3 at the desired frequency. It is also apparent that any change in the phase between the synchronizing impulses and the generator deflection voltage will cause the amplitude of this control voltage to change in such a manner so as to bring the oscillator back into synchronism with the synchronizing impulses.

The output of the discharge device 30 is applied to the control electrode of the discharge device 31 of the deflection oscillator 3 through a resistor 32, and a variable resistor 33. The resistor 33 provides a manual frequency control for the oscillator.

The deflection oscillator 3 will be described in detail hereinafter, and it is believed sufficient at this point to state that the output of the deflection oscillator is applied to the control electrode of the electron discharge device 34, through a capacitor 35. The discharge device 34 has its control electrode connected to ground through the usual grid leak resistor 36 and its cathode connected to ground through a conventional biasing resistance capacitance network 37. The screen electrode of the discharge device 34 is connected to a unidirectional voltage source +SG, through a resistor 38. The anode of the discharge device 34 is connected to a point on the primary winding 20*a* of the output transformer 20, and anode potential is received from a unidirectional source B+ through a portion of this primary winding 20*a*, as shown.

High potential impulses appearing on the anode of device 34 are increased in value by the auto-transformer action of transformer 20. These impulses are applied to the anode of a rectifying device 39 through a protective resistor 40. The high potential unidirectional output from device 39 is filtered by means of a resistor 43 connecting the cathode of this device to a terminal 42 and a capacitor 41 coupling this cathode to ground. The high value, unidirectional potential appearing between terminal 42 and ground provides the required operating potential for the cathode-ray image tube.

One extremity of the secondary winding 20*b* of the output transformer 20 is connected to the automatic frequency control circuit, as previously described. The other extremity of the secondary winding 20*b* is connected to the horizontal deflection coil 44 of the cathode ray tube, and a point between these extremities is connected to ground, as shown, through a variable impedance 45, which provides a manual control of the horizontal size of the image.

These latter circuits are conventional, and form no part of the present invention, and further discussion of these circuits is deemed to be unnecessary.

A detailed description will now be given of the deflection oscillator 3, with reference to Figs. 1 and 2. This circuit comprises two electron discharge devices 31 and 46. The anode potential is applied to these discharge devices from a unidirectional source B+ through resistors 54 and 55 respectively. The cathodes of these discharge devices are connected together and to ground through a resistor 47 in series with a parallel resonant circuit, comprising a variable inductance 48 and a capacitor 49. The resonant circuit 48, 49 is tuned to the frequency of the synchronizing impulses. The control electrode of the discharge device 31 is coupled to the anode of the discharge device 46 through a capacitor 50, and returned to ground through a usual grid leak resistor 51. The anode of the discharge device 31 is connected to ground through a peaking resistor 53 and a capacitor 52 connected in series. The control electrode of the discharge device 46 is connected directly to ground. The output of the oscillator is taken from the anode of discharge device 31 and applied to the control electrode of electron discharge device 34, as previously described.

The circuit set forth above is substantially similar to the conventional multivibrator oscillator, the difference being the inclusion of a parallel resonant circuit tuned to the frequency of the synchronizing impulses, in the cathode circuit.

Assuming that the oscillator 3 is in such a state the devcie 36 is conductive and device 31 non-conductive, capacitor 52 is charged through resistors 54 and 53 from the unidirectional source B+. The potential rise across capacitor 52 is essentially linear with respect to time, as this capacitor charges only to about 20 per cent or less of its final value. As the potential rise across the capacitor 52 increases, the potential of the anode of device 31 also increases, as shown in Fig. 2 (A), until a point *a* is reached where this device is no longer biased to cut-off and device 31 begins to conduct. This resulting current flow through device 31 biases the cathodes of devices 31 and 46, as shown in Fig. 2 (B) at *b* and device 46 becomes less conductive and its anode potential rises. The rise in anode potential of device 46 is applied to the control electrode of device 31 through capacitor 50 and device 31 becomes more conductive. It can be seen that the action is cumulative and the anode potential of device 31 rapidly drops to $a'$ as shown in Fig. 2 (A), devcie 31 becoming fully conductive and device 46 becoming non-conductive. Capacitor 50 now begins to discharge and the control electrode 31 is driven in a negative direction. After a time T in Fig. 2 (A) this control electrode is driven to a point where there is a slight decrease in the current through device 31 and thence by a rapid cumulative action the oscillator is returned to its original state, and capacitor 52 once again begins to charge.

Figure 2:
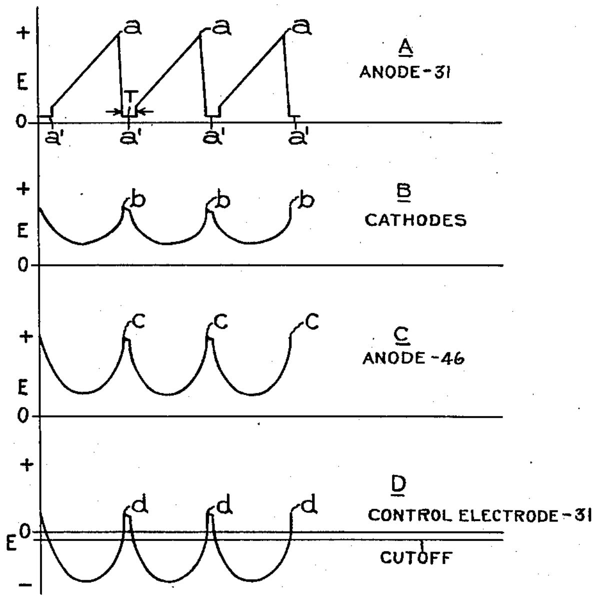
Fig. 2 shows various curves which add to the understanding of the oscillator circuit in Fig. 1.

It can be seen that once a cycle, a potential pulse of width T appears on the anode of device 31 as shown at $a'$ in Fig. 2 (A). This pulse gives rise to a flow of current through the device and hence an equivalent potential pulse appears across resistor 47. The above-mentioned current pulse also flows through the tuned circuit 48, 49 and develops thereacross a sine wave of potential. There is, therefore, developed across the series circuit comprising resistor 47 and tuned circuit 48, 49, a potential of waveform representative of the sum of the above-mentioned sine wave across the tuned circuit 48, 49 and potential pulse across resistor 47. The potential developed across the above-mentioned series circuit and, thus, the potential applied to the cathodes of devices 31 and 46 is shown in Fig. 2 (B), with peaks shown recurring at the resonant frequency of the tuned circuit 48, 49. This potential is amplified in device 46 and appears in like phase on the anode of this device as shown in Fig. 2 (C) with recurring peaks at $c$.

The potential on the control electrode of device 31, therefore, takes the form shown in Fig. 2 (D), and this device is biased well beyond cut-off at all times except in the small time interval in the vicinity of peaks $d$ when this electrode is driven positive.

It can be seen, therefore, that the present oscillator generates its own synchronizing impulses dependent on the resonant frequency of tuned circuit 48, 49. When the resonant frequency of this circuit is made equal to the frequency of the synchronizing impulses, the oscillator will have an extremely stable free-running frequency substantially equal to the frequency of the synchronizing impulses, and well within the range of the automatic frequency control circuit.

From the foregoing, it is apparent that one of the features affecting the frequency of the oscillator is the bias on the control electrode of discharge device 31, and the frequency of the oscillator may be independently controlled by varying the above-mentioned bias. Due to the fact that the resonant circuit 48, 49 is tuned to the frequency of the synchronizing signals, the sharp peaks at $d$ in Fig. 2 (D) occur substantially at the frequency of the synchronizing signals, and thus the free running frequency of the oscillator is substantially that of the frequency of synchronizing signals and the frequency of the oscillator is therefore maintained within range of the ordinary frequency control circuit 1.

Figure 3:
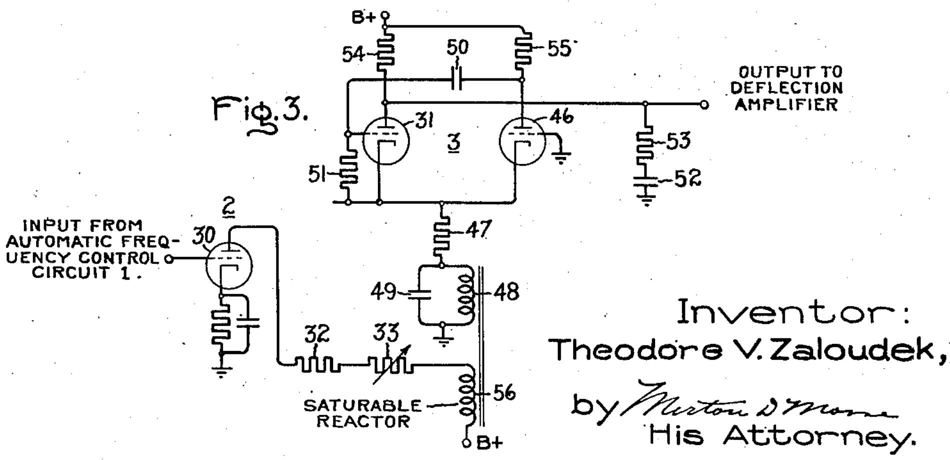
Fig. 3 shows a modification of the invention.

The modifications of this invention shown in Fig. 3 differs from the embodiment shown in Fig. 1 only in the means whereby the unidirectional control potential is applied to the deflection oscillator. In the modification of this figure the output from the direct current amplifier 2 is applied to the deflection oscillator 3 by means of winding 56 of a saturable reactor. The inductance 48 of the parallel resonant circuit 48, 49 formed a second winding of the reactor, and it is apparent that any change in the unidirectional current through the direct current amplifier 2 is reflected in the winding 48, and the frequency of the tuned circuit 48, 49 and thus the frequency of the deflection oscillator is affected accurately.

Although two means have been discussed whereby the automatic frequency control potential may be applied to the deflection oscillator, it is obvious that many other means, for example, a conventional reactance tube control circuit, may be used.

I have, therefore, shown in the foregoing a stable deflection oscillator which develops its own synchronizing signals having a frequency determined by the resonant frequency of the tuned circuit 48, 49, thus maintaining the free running frequency of the deflection oscillator within the range of the automatic frequency control circuit.

While I have shown particular embodiments of my invention, it will of course be understood that I do not wish to be limited thereto since various modifications may be made and I contemplate by the appended claims to cover any such modifications that fall within the true spirit and scope of my invention.

What I claim as new and desire to secure by Letters Patent of the United States is:

1. In a frequency control system arranged to be controlled by synchronizing waves of a predetermined desired frequency, the combination of a synchronizable, free-running, periodic pulse generator of the multivibrator type comprising a plurality of electron discharge devices, said discharge devices each having an anode, a control electrode and a cathode, and a common connection between the cathodes of said devices, means for synchronizing said pulse generator with said waves, and means for maintaining the free-running frequency of said generator at said desired frequency comprising a resonant circuit tuned to said desired frequency connected between said cathodes and ground, whereby said periodic pulse generator oscillates at said desired frequency even in the absence of said synchronizing waves.

2. In combination, a synchronizable, cathode ray tube deflection oscillator of the multivibrator type having a predetermined free-running frequency, a source of synchronizing impulses recurring at substantially the same frequency, rectifying and comparing means for comparing the phase between the output of said oscillator and said synchronizing impulses and for developing a unidirectional control potential dependent in magnitude upon said phase, means for applying said control potential to said oscillator to control the frequency of said oscillator, and means comprising a resonant circuit tuned to the frequency of the synchronizing impulses and included in a frequency-determining circuit of said oscillator to stabilize the free-running frequency of said oscillator at substantially the frequency of said synchronizing impulses.

3. In combination, a synchronizable, cathode ray tube deflection oscillator of the multivibrator type having a predetermined free-running frequency, a source of synchronizing impulses recurring at substantially the same frequency, a balanced phase detector, means comprising said balanced phase detector for comparing the phase between the output of said oscillator and said synchronizing impulses and for developing a unidirectional control potential at the output of said phase detector dependent in magnitude upon said phase, means for applying said unidirectional control potential to said oscillator to control the frequency thereof, and means comprising a resonant circuit tuned to the frequency of said synchronizing impulses and included in a frequency-determining circuit of said oscillator to maintain the frequency of said oscillator within the control range of said balanced phase detector.

4. In an automatic frequency control system, the combination of a synchronizable, free-running, cathode ray tube deflection oscillator of the multivibrator type comprising a plurality of electron discharge devices, said discharge devices each having an anode, a cathode, and a control electrode, means comprising a common coupling connection between the cathodes of said discharge devices for causing said oscillator to operate at a predetermined free-running frequency, a source of synchronizing impulses recurring at substantially the same frequency, means for comparing the phase between the output of said oscillator and said synchronizing impulses and for developing a unidirectional control potential dependent in magnitude upon said phase, means for applying said control potential to said oscillator to control the frequency thereof, and means comprising a resonant circuit tuned to the frequency of the synchronizing impulses and connected between the common cathode circuit of said discharge devices and ground, to stabilize the frequency of said oscillator at substantially the frequency of said synchronizing impulses.

5. In a frequency control system arranged to be controlled by a train of synchronizable, free-running, cathode ray tube deflection oscillator of the multivibrator type comprising a plurality of electron discharge devices, said discharge devices each having an anode, a cathode, and a control electrode, means comprising a common coupling connection between the cathodes of said discharge devices for causing said oscillator to operate at a free-running frequency substantially equal to said desired frequency, means to synchronize said oscillator with said synchronizing impulses, means comprising a balanced phase detector connected between said oscillator and said source for developing a control potential dependent on their phase difference, means utilizing said potential to control the oscillator frequency, and means comprising a resonant circuit tuned to the frequency of said synchronizing impulses and included in the common cathode circuit of said discharge devices to stabilize the free-running frequency of said oscillator at substantially the frequency of said synchronizing impulses.

THEODORE V. ZALOUDEK.

REFERENCES CITED

The following references are of record in the file of this patent:

UNITED STATES PATENTS

| Number | Name | Date |
|---|---|---|
| 1,744,935 | Van Der Pol | Jan. 28, 1930 |
| 2,209,507 | Campbell | July 30, 1940 |
| 2,250,284 | Wendt | July 22, 1941 |
| 2,346,396 | Rider | Apr. 11, 1944 |
| 2,356,071 | MacDonald et al. | Aug. 15, 1944 |
| 2,358,545 | Wendt | Sept. 19, 1944 |
| 2,389,025 | Campbell | Nov. 13, 1945 |
| 2,419,772 | Gottier | Apr. 29, 1947 |
| 2,426,996 | Goodall | Sept. 9, 1947 |
| 2,434,294 | Ginzton | Jan. 13, 1948 |
| 2,458,156 | Fredendall | Jan. 4, 1949 |
| 2,461,871 | Bass | Feb. 15, 1949 |
| 2,462,078 | Earp | Feb. 22, 1949 |
| 2,464,259 | Proskauer | Mar. 15, 1949 |

FOREIGN PATENTS

| Number | Country | Date |
|---|---|---|
| 485,934 | Great Britain | May 26, 1938 |
| 583,996 | Great Britain | Jan. 3, 1947 |